F. KOPERSKI.
SPRING MOTOR.
APPLICATION FILED AUG. 4, 1915.

1,170,760.

Patented Feb. 8, 1916.
2 SHEETS—SHEET 1.

Inventor
Frank Koperski.

By Moulton & Livrance
Attorneys

THE COLUMBIA PLANOGRAPH CO., WASHINGTON, D. C.

F. KOPERSKI.
SPRING MOTOR.
APPLICATION FILED AUG. 4, 1915.
1,170,760.
Patented Feb. 8, 1916.
2 SHEETS—SHEET 2.
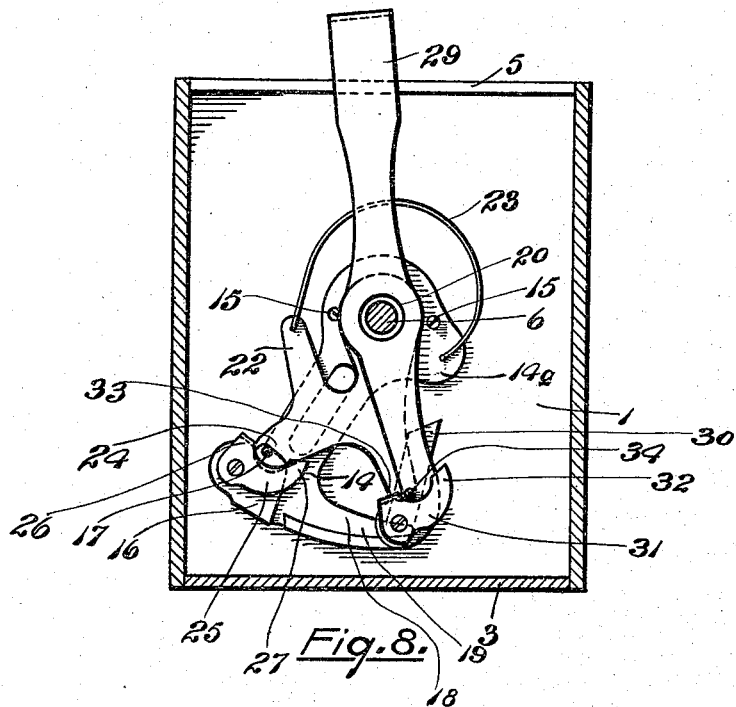
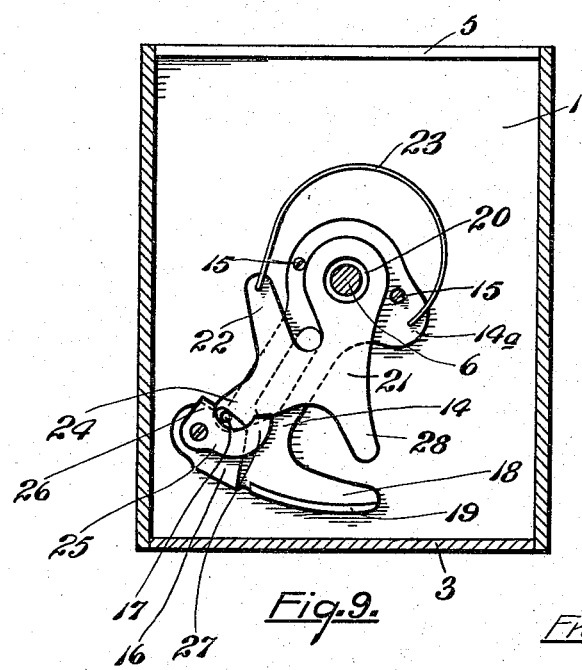
Inventor
Frank Koperski.
By Moulton & Liverance
Attorneys

UNITED STATES PATENT OFFICE.

FRANK KOPERSKI, OF BAY CITY, MICHIGAN, ASSIGNOR OF ONE-HALF TO KASIMAR E. NIEDZIELSKI, OF BAY CITY, MICHIGAN.

SPRING-MOTOR.

1,170,760.   Specification of Letters Patent.   Patented Feb. 8, 1916.

Application filed August 4, 1915. Serial No. 43,627.

*To all whom it may concern:*

Be it known that I, FRANK KOPERSKI, a citizen of the United States of America, residing at Bay City, in the county of Bay and State of Michigan, have invented certain new and useful Improvements in Spring-Motors; and I do hereby declare the following to be a full, clear, and exact description of the invention, such as will enable others skilled in the art to which it appertains to make and use the same.

This invention relates to a spring motor especially adapted to be used in swinging a cradle or the like, mounted upon a horizontal axis, the connection of the motor to the cradle being fully shown in my previous application.

The present invention has to do with the specific construction of the motor and the mechanism thereof by means of which it may be utilized to rock a cradle or the like.

It is an object and purpose of the invention to provide a motor of this type made of comparatively few and inexpensive elements, and one which can be readily constructed to operate efficiently for the purpose described.

Figure 1:
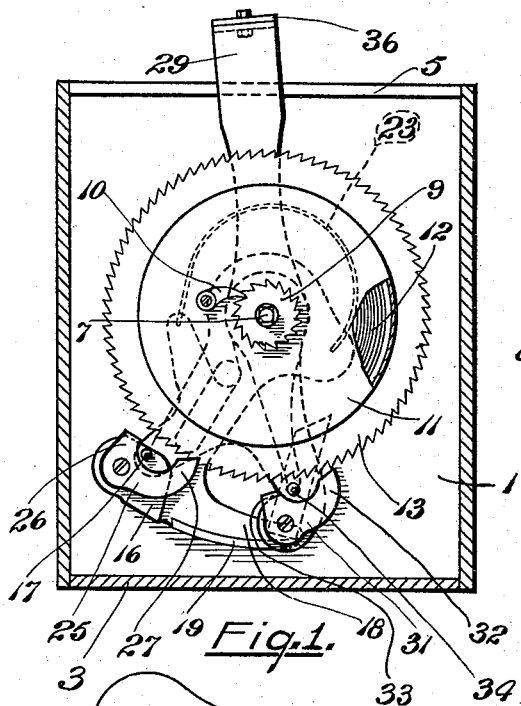
Figure 2:
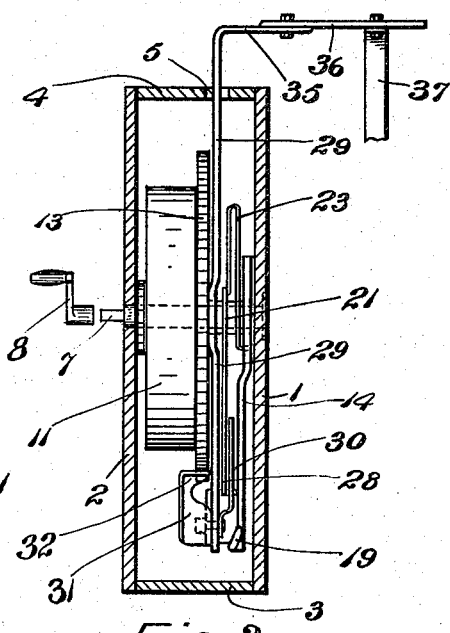
Figures 3, 4, 5:
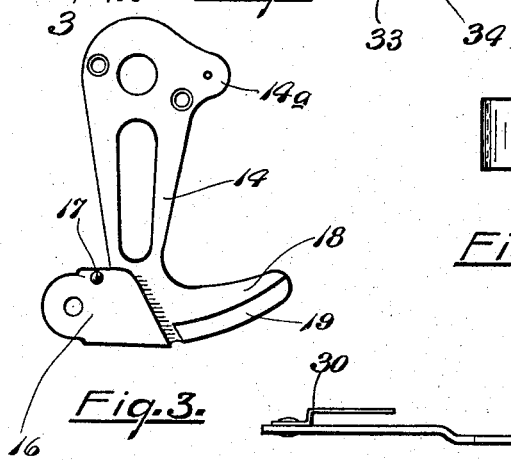
Figure 6:
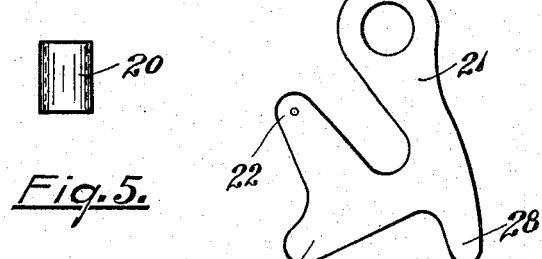
Figure 7:
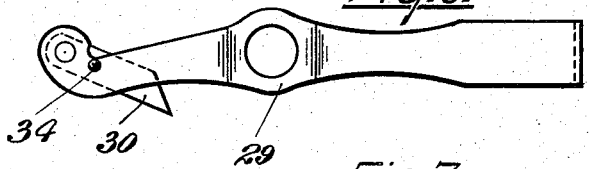

For an understanding of the construction of the motor reference may be had to the accompanying drawings in which;

Figure 1 is a front elevation of the motor, the forward side of the casing inclosing the motor being removed. Fig. 2 is a partial sectional and side view of the motor and inclosing casing. Figs. 3, 4 and 5 are front elevations illustrating certain elements of the construction. Fig. 6 is an edge view, and Fig. 7 is a front view of the oscillating arm forming an element of the motor. Fig. 8 is a partial sectional and front view of the motor, the housing for the spring being removed; and Fig. 9 is a view similar to Fig. 8 with an additional element, namely, the oscillating arm, removed.

Like reference characters refer to like parts throughout the several views of the drawings.

The housing or casing inclosing the motor comprises in its construction a back 1, front 2, bottom 3 and top 4 in which a slot 5 is cut as shown, suitable sides completing the casing. A shaft 6 is supported horizontally by and between the back and front of the casing, its forward end extending through the front and squared as shown at 7 to receive a key 8 by means of which it may be turned to wind the spring of the motor which will be hereafter described. A ratchet wheel 9 is fastened to shaft 6 and a pawl 10 is pivotally mounted on the rear side of the front 2 engaging with the ratchet wheel 9, permitting it to be turned in one direction but not in the other.

A cylindrical housing 11 contains a spring 12 attached at one end to the shaft 6 and at the other to the housing in the usual manner so that when the shaft is turned with the housing relatively stationary the spring is wound. A disk 13 provided with a continuous series of teeth on its periphery is secured to the back of housing 12.

An irregular shaped member 14 is rigidly secured by means of screws 15 to the back 1, its lower end extending downwardly at an angle to the vertical as shown in Figs. 1, 8 and 9, and the shaft 6 passing through its upper end. A part 16 of the member is turned back on itself at the lower end and carries a forwardly extending stop pin 17 while a section 18 extends at an angle to the body of member 14, its outer edge being formed with an inclined surface 19 lying substantially in an arc of a circle, the center of which is the axis of the shaft 6.

A sleeve 20 is loosely received over the shaft 6 immediately in front of the member 14 and a second irregular shaped member 21 is hung on this sleeve. The member 21 has an upwardly extending arm 22 between which and a projection 14ª formed on the member 14 a spring 23 is positioned, the spring being under stress and tending to rotate the member 21 in a clockwise direction. Member 21 is further provided with a short projection 24 extending downwardly and outwardly from the shaft 6 being received between the body of member 14 and the turned back portion 16 thereof. A dog 25 is pivotally mounted on the outer surface of the part 16 and has an inwardly extending projection 26 turned in over the part 16 into the path of movement of the projection 24. The other end 27 of the member 25 bears against the ratchet disk 13 and normally is held thereagainst by the action of spring 23 forcing the projection 24 against the extension 26, the member 25 thereby preventing the rotation of the disk 13 and the attached housing 12 which would otherwise occur. Member 21 is further provided with a downwardly extending arm 28 which lies alongside of an oscillating arm 29 pivotally supported over the sleeve 6 and having an upper end extending through the slot 5 while at its lower end an angular guide 30 is rigidly attached between which and the body of member 29 arm 28 passes. A dog 31 is pivotally mounted on the lower end of the oscillating arm 29 having an end 32 adjacent the ratchet disk 13 while its other end 33 is turned inwardly over the edge of oscillating arm 29 and lies directly in the path of movement of the arm 28 of member 21. A stop pin 34 projects from the oscillating arm 29. It will be noted that both dogs 25 and 31 are of such construction and are so located that the ends 27 and 32 thereof, when permitted, under action of gravity drop away from the ratchet disk. At times in the operation of the machine the pawls are free and it is to prevent a too far turning movement of the pawls that stops 17 and 34 are placed in the paths of the members 33 and 26 of the pawls.

At its upper end the oscillating arm 29 is bent at right angles to the rear as indicated at 35 having pivotal connection with the end of a bar 36 mounted to turn about a vertical pivot on the support 37. Bar 36 extends to the rear and is connected in any suitable manner with a cradle or the like on the underside thereof, the cradle being pivotally mounted to rotate back and forth on a horizontal axis as shown in the application previously noted.

The operation of the motor described is as follows: The cradle has a normal tendency to stop with its center of gravity lying in a vertical plane containing the pivotal axis about which it rotates. When a cradle is moved to one side and released it normally oscillates back and forth for a short time or until the friction developed in the cradle absorbs all of the energy first applied in giving movement to the cradle. With my motor attached when the movement of the cradle is initiated, arm 29 is correspondingly turned back and forth about its pivotal mount. Referring to Figs. 1, 8 and 9, as the lower end of the oscillating arm moves toward the right the extension 33 of dog 31 strikes against the arm 28 of member 21 turning member 21 about its pivot and moving the projection 24 away from the inwardly turned end 26 of dog 25. When the end 33 strikes arm 29 the first effect is to elevate the end 32 into engagement with a tooth of the ratchet 33 and by reason of the momentum of the cradle and oscillating arm, said disk and its attached housing are moved slightly tending to wind up the spring, the movement, though very slight, being sufficient to relieve the pressure against the end 27 of pawl 25 so that it may drop under the influence of gravity, the projection 24 having been moved away from the inturned end 26. It will be clear that with pawl 25 disengaged from the ratchet housing 11 disk 13 is free to rotate in a clockwise direction under the influence of the spring 12. End 32 of pawl 31 being in engagement with the disk, the lower end of the oscillating arm is thrown to the left by the rotation of the disk and an impulse given to the oscillating arm. This impulse lasts but a short time, however, by reason of the fact that as soon as the lower end of arm 29 has moved to the left a short distance the end 33 of pawl 31 is moved away from arm 28 freeing the member 21 so that the only influence acting upon it is spring 23 which immediately forces projection 24 against the inturned end 26 of pawl 25 bringing its end 27 against the disk 13 and stopping the rotation thereof. In fact the impulse acts only for a sufficient length of time to rotate the disk 13 the space of one notch at each oscillation of the arm 29 before it is stopped by pawl 25 but the impulse given to the arm is sufficient to overcome the friction and furnish any other force necessary to rock the cradle. The motor accordingly acts in a manner similar to the working of a pendulum, that is, the impulse which keeps the device working is applied momentarily and is sufficient to store energy in a moving device acted upon so that on its return movement it will pass each time equal distances beyond the normal stopping place of the device and at which place it would stop in a short time if the motor was not connected thereto.

I claim:—

1. In combination, a shaft, an arm pivotally mounted between its ends on the shaft and having said ends extending upwardly and downwardly from the shaft, a disk provided with a continuous series of teeth at its periphery rotatably mounted on the shaft, a spring connected to the shaft and disk tending to rotate the disk, a relatively stationary member, a dog mounted thereon adjacent the disk, an irregularly shaped member loosely carried by the shaft, an arm on said member adjacent the dog, a spring interposed between the stationary and irregularly shaped members operating said last member against the dog to bring it into engagement with the disk, a dog pivotally mounted at the lower end of the arm, an arm on the irregularly shaped member interposed in the path of movement of the dog as the first arm oscillates, bringing the dog carried thereby momentarily into engagement with the disk and freeing the dog on the stationary member from the disk.

2. In combination, a shaft, an arm pivotally mounted between its ends on the shaft having one end extending downwardly and the other upwardly from the shaft, a disk provided with a continuous series of teeth at its periphery rotatably mounted on the shaft, a spring connected to the shaft and disk tending to rotate the disk, a relatively stationary member back of the disk and extending in a downward direction and having a part bent back upon the body of the member, a dog pivotally mounted on said part having an extension bent inwardly over said part, an irregularly shaped member loosely carried on the shaft between its stationary member, and the pivotally mounted arm, an arm to said member adapted to engage against the extension to the dog, a spring interposed between the irregularly shaped and stationary members operating upon the former to bring said arm thereof against said extension to the dog, a dog on the lower end of the pivotally mounted arm located adjacent the disk, and a second arm on said irregularly shaped member interposed in the path of movement of the dog as said pivotally mounted arm oscillates, and acting to momentarily bring said dog into engagement with the disk simultaneously with the freeing of the dog on the stationary member from the said disk.

In testimony whereof I affix my signature in presence of two witnesses.

FRANK KOPERSKI.

Witnesses:
EDWARD R. MONROE,
FRANK C. FEARMAN.

Copies of this patent may be obtained for five cents each, by addressing the "Commissioner of Patents, Washington, D. C."